United States Patent [19]
Patel et al.

[11] Patent Number: 5,726,367
[45] Date of Patent: Mar. 10, 1998

[54] APPARATUS AND METHOD FOR TESTING SPRING POWERED SWITCHES

[75] Inventors: Nagar J. Patel; James J. Benke, both of Pittsburgh; Michael C. Valenta, McKeesport; Norman Davies, Irwin, all of Pa.

[73] Assignee: Eaton Corporation, Cleveland, Ohio

[21] Appl. No.: 618,058

[22] Filed: Mar. 25, 1996

[51] Int. Cl.⁶ ................................................. G01D 9/38
[52] U.S. Cl. ............................................... 73/865.9
[58] Field of Search ...................... 73/865.9; 346/436, 346/139 R

[56] References Cited

U.S. PATENT DOCUMENTS

| | | | |
|---|---|---|---|
| 2,852,736 | 9/1958 | Spahn, Jr. | 73/865.9 |
| 4,743,876 | 5/1988 | Milianowicz et al. | 335/20 |

FOREIGN PATENT DOCUMENTS 6074793  3/1994  Japan .................. 346/139 R

OTHER PUBLICATIONS

Westinghouse & Cutler/-Hammer Products: *Instructions For the Use, Operation and Maintenance of the Red Line Type VCP-WR Vacuum Circuit Breaker Elements*; I.B. 8295A61H01; Apr. 1, 1994.

*Primary Examiner*—Robert Raevis
*Attorney, Agent, or Firm*—Martin J. Moran

[57] ABSTRACT

Operation of a medium voltage spring powered circuit breaker is analyzed by applying a recording medium in the form of an adhesive backed tape to a selected driven part of the operating mechanism. A marking instrument is held in contact with the recording medium at a fixed point by a fixture in the form of a template secured to the circuit breaker frame. When the charged closing springs of the operating mechanism are released, the marking instrument produces a trace on the recording medium which is then analyzed to provide a quantitative evaluation of switch operation, including overtravel of the selected driven part.

10 Claims, 7 Drawing Sheets

APPARATUS AND METHOD FOR TESTING SPRING POWERED SWITCHES

BACKGROUND OF THE INVENTION

1. Field of the Invention

This invention relates to testing the mechanical operation of spring powered switches such as medium voltage circuit breakers.

2. Background Information

Switches carrying sizable electric currents, such as medium voltage circuit breakers, require substantial mechanical forces to operate the switch rapidly and to hold the contacts closed against the magnetic repulsion forces generated by the current. In a typical medium voltage circuit breaker, a set of charged closing springs is released to close the breaker and to charge an opening spring, which in turn is released to open the breaker. The speed at which the mechanism operates is so rapid that it is difficult to identify the nature of any malfunctions, or even in some cases, to discern that the breaker is not operating properly.

Under current practice, a skilled engineer is dispatched to the field or the breaker must be returned to the factory to determine the cause and remedy for a malfunction or inferior performance. Due to the high inertia developed in the operating mechanism there is considerable overshoot and distortion of the parts during operation which can only be analyzed by an expensive camera system. Often the analysis is qualitative rather than quantitative, e.g., it is determined that there is excessive overshoot, but no measurement of the amount of overshoot is provided. Thus, current techniques for analyzing the operation of such switches is expensive and time consuming, and is highly dependent upon the skill and experience of the tester.

There is a need, therefore, for an improved apparatus and method for testing spring operated switches.

In particular, there is a need for such an improved apparatus and method which provides a quantitative measure of the performance of spring operated switches.

There is a further need for such an improved apparatus and method which provides a permanent record of the operation of the spring operated switch.

There is a further need for such a permanent record which can be easily read and maintained at the switch and/or transported for remote analysis and/or storage.

There is an additional need for such an improved apparatus and method which can be easily used by unskilled personnel.

There is also a need for such an improved apparatus and method which is inexpensive and can therefore be economically repeated frequently.

SUMMARY OF THE INVENTION

These needs and others are satisfied by the invention which is directed to a method and apparatus for testing the operation of a spring powered switch mounted in a support frame and operated by an operating mechanism having driven parts actuated by release of charged springs. A recording medium, such as a tape for example, is applied to one of the driven parts. A fixture mounted to the support frame adjacent the selected driven part supports a marking instrument in contact with the recording medium at a fixed point relative to the support frame. When the charged spring is released, the selected driven part carrying the recording medium, moves relative to the marking instrument. This produces a trace on the recording medium representing the movement of the selected driven part relative to the fixed point. This trace provides a quantitative record of the movement of the selected driven part which can be used to analyze the performance of the switch operating mechanism. As the driven parts overtravel before returning to a rest position due to the inertia generated by the sizable spring forces, the marking instrument contacts the recording medium at an intermediate point on the trace when the selected driven part returns to its rest position. The quantitative analysis includes measuring this overtravel as the distance between the end of the trace and the point contacted by the marking instrument when the parts come to rest. To permanently record this point, the marking instrument can be rocked side- to-side before being removed.

Preferably, the recording medium is removable from the driven part so that it may be transported elsewhere for analysis and storage. Where a tape with an adhesive backing is used, it can even be reapplied to the frame for later reference.

The fixture is preferably a template which is secured to the frame of the switch over the selected driven part. An aperture in the template supports the marking instrument at the fixed point. For use with a plurality of switches having the selected driven part at different locations relative to the frame, the template is provided with an aperture for the fixed point for each switch type.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
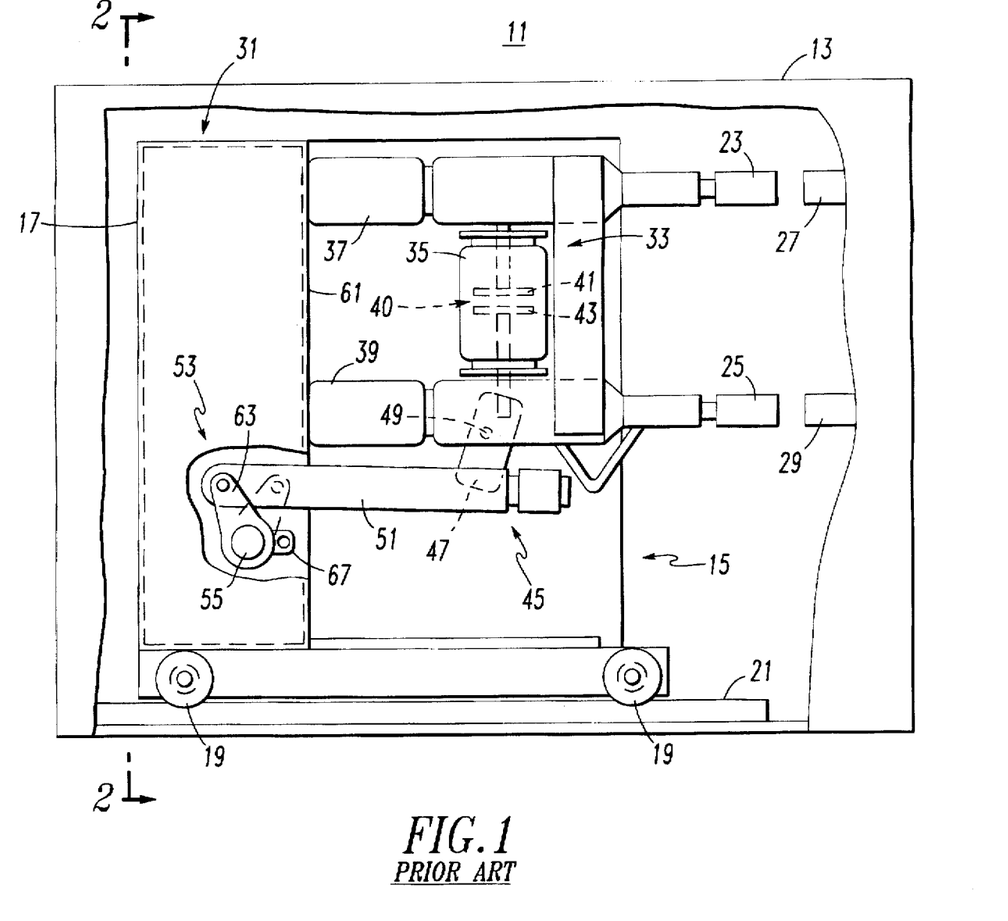
FIG. 1 is a side elevational view with some parts cut away with a typical medium voltage circuit breaker in accordance with the invention shown in the disconnected position.
Figure 2:
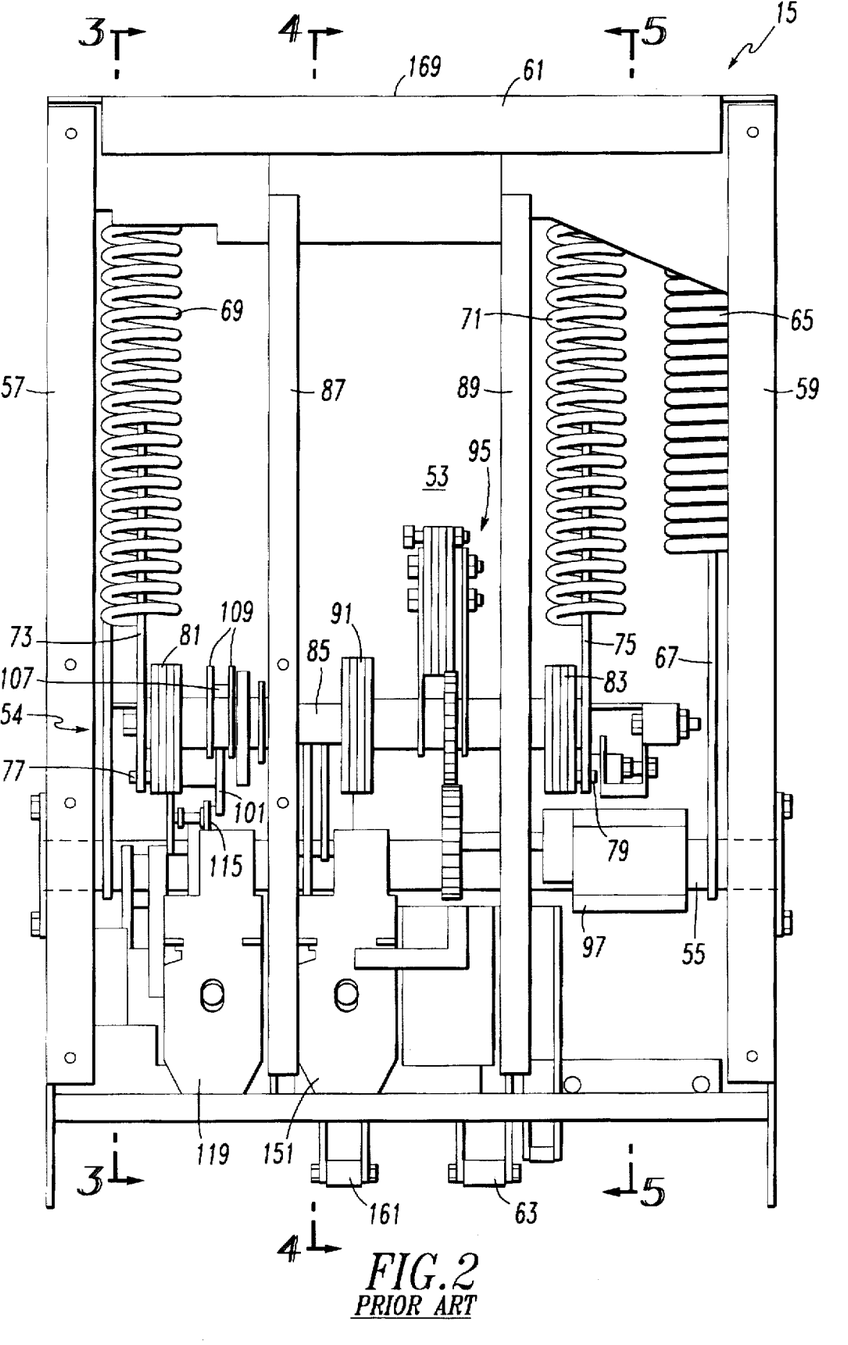
FIG. 2 is a front elevation view of a typical circuit breaker as seen in FIG. 1 with the cover removed.

As shown in FIGS. 1 and 2, a metal-clad or metal-enclosed switch gear apparatus 11 includes a metal cabinet or enclosure 13 for enclosing a circuit breaker 15. The exemplary circuit breaker 15 is preferably a draw-out three-phase vacuum circuit interrupter having controls on a front face 17 for manually operating the circuit breaker. The circuit breaker 15 has wheels 19 which engage rails 21 for inserting the circuit breaker into and removing the circuit breaker from the enclosure 13. Movement of the circuit breaker 15 along the rails 21 also effects connection and disconnection of terminals 23 and 25 on the circuit breaker 15 with line and load terminals 27 and 29 mounted in the enclosure 13, in a well known manner. While a medium voltage vacuum interrupter is shown for the circuit breaker 15, the invention is also applicable for use with air circuit breakers.

The circuit breaker 15 has a front low voltage section 31 adjacent to the front panel 17 and a rear high voltage section 33 containing a vacuum interrupter 35 for each phase. The low and high voltage sections 31, 33 are electrically insulated from each other by upper and lower insulators 37 and 39. Within each vacuum interrupter 35, a pair of separable contacts 40 including a stationary contact 41 and a moveable contact 43 are provided. The contacts 40 are operated between the open position (shown) and a closed position by a linkage 45 which includes a bell crank 47 pivoted at 49 and an insulated push rod 51 extending into the low voltage section 31.

An operating mechanism 53 for opening and closing the separable contacts 40 through the linkage 45 is contained in the low voltage section 31. This operating mechanism 53 has a number of driven parts 54 which include a pole shaft 55 which is rotatably journaled in side walls 57 and 59 of a frame or housing 61. A pole arm 63 for each phase projects laterally from the pole shaft 55 and is pivotally connected to the associated push rod 51 so that rotation of the pole shaft 55 simultaneously opens or closes the separable contacts 40 of each pole. The pole shaft 55 is rotated counter-clockwise as viewed in FIG. 1 to open the contacts 40 by an opening spring 65 in the form of a helical tension spring connected at one end to an upper portion of the frame 61 of the low voltage section 31 and at the other end to a lever arm 67 mounted on the pole shaft 55.

The operating mechanism 53 also includes a pair of helical tension closing springs 69 and 71 each of which is connected at its upper end to the frame 61 and at its lower end through a spring link 73, 75 to an eccentric pivot 77, 79 on a spring crank 81, 83, respectively. The spring cranks 81 and 83 are mounted on opposite ends of a crank shaft 85 rotatably supported between a pair of spaced supports 87 and 89. Fixed on the crank shaft 85 between the supports 87 and 89 is a closing cam 91 which includes a notch 93 in the peripheral cam surface thereof (see FIGS. 4a–c).

The crank shaft 85 is rotated to extend or charge the two closing springs 69 and 71 by a charging mechanism 95 engaging the crank shaft between the closing cam 91 and the support 89. As is well known, this charging mechanism 95 includes an electric motor 97 which can be energized to rotate the crank shaft 85 counterclockwise as shown by the arrows in FIGS. 4a–c through a ratchet. Alternatively, as is known, the crank shaft can be manually rotated to charge the closing springs 69, 71 by a charging lever (not shown) which engages the charging mechanism 95. The closing springs 69 and 71 are retained in the charged condition and released by a first, closing spring release 99 (see FIGS. 3a and b) which includes a close spring release latch 101 pivotally connected on a shaft 103. This closing spring release latch has a latch surface 105 which is engaged by a latch roller 107 supported between a pair of roller support arms 109 fixed to the crank shaft 85.

Figure 3A:
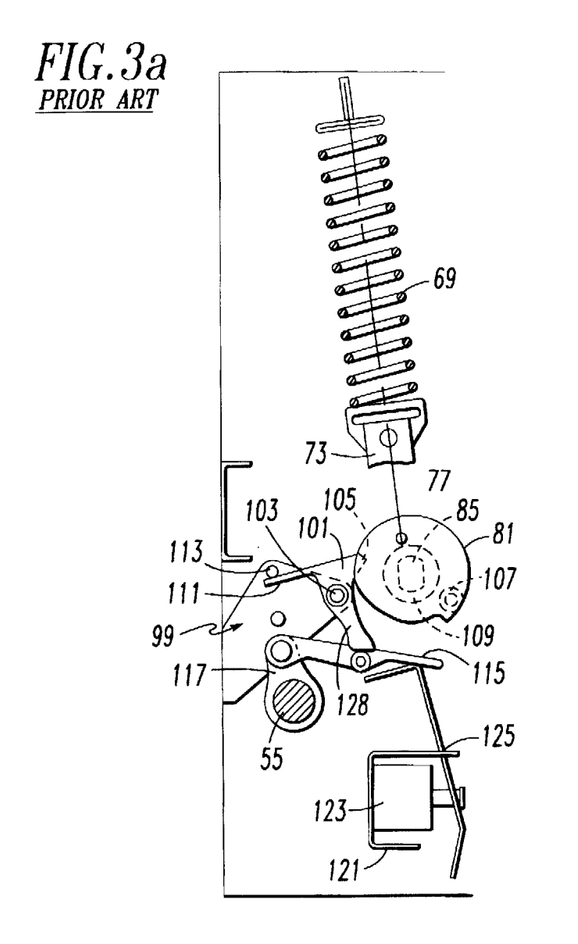
FIG. 3a is a sectional view taken along the line 3—3 in FIG. 2 shown with the breaker in the open position and the closing springs discharged.

With the circuit breaker open and the closing springs 69 and 71 discharged as shown in FIG. 3a, operation of the charging mechanism 95 causes the crankshaft 85 to rotate in a counterclockwise direction as shown by the arrow. This causes the eccentric pivots 77, 79 to move downward thereby extending the closing springs 69 and 71. Just after the eccentric pivots 77, 79 carry the lines of action of the closing springs 69, 71 through the center of the crank shaft 85, the closing latch roller 107 engages the latch surface 105 on the closing spring release latch 101. The tendency of the closing spring 69, 71 to continue the rotation in the clockwise direction is blocked by the engagement of an extension 111 on the release latch 101 with a fixed pin 113.

Figure 3B:
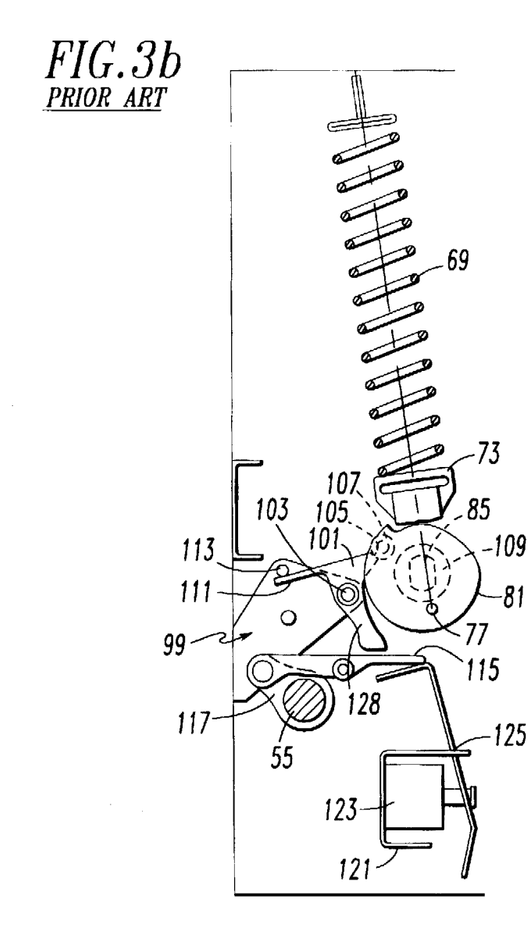
FIG. 3b is similar to FIG. 3a but showing the breaker closed with the closing springs charged.

The release latch 101 is operated by a release lever 115 pivotally connected at one end to an arm 117 on the pole shaft 55. The other end of the release lever 115 rests on a close clapper 119. The close clapper 119 in turn is pivotally supported on a bracket 121 which also supports a close solenoid 123. Rotation of the close clapper 119 clockwise in FIG. 5b about a pivot axis 125, either manually by pressing on the lower end of the clapper, or automatically by energization of the close solenoid 123, causes counterclockwise rotation of the release lever 115. The release lever 115 engages a projection 128 on the close spring release latch 101 which is rotated counterclockwise until the close latch roller 107 slips off of the latch surface 105. This permits the closing springs 69 and 71 to rapidly rotate the crank shaft 85. As will be seen, this results in rotation of the pole shaft 55 to close the separable contacts 40 of the circuit breaker. The force generated by two closings springs is required as they not only operate the mechanism 53 to close the separable contacts 40, but they also charge the opening spring 65. With the circuit breaker closed as shown in FIG. 3b, the release lever 115 is lowered so that if the closing springs 69, 71 are recharged (as shown), the release lever 115 will not engage the closing spring release latch 101 and thus the closing springs cannot be discharged. The maintains the circuit breaker 15 ready for a recharge should the breaker trip open.

The operating mechanism 53 also includes a coupling mechanism 127 for coupling the crankshaft 85 to the pole shaft 55. This coupling mechanism includes a pair of parallel main links 129 each pivotally connected at one end to the pole shaft 55 through a crank arm 131 and rotatably supporting a main link roller 133 between their free ends. This main link roller 133 engages the peripheral surface of the closing cam 91 which, as the crank shaft rotates, pushes on the main links 129 to rotate the pole shaft 55 through the eccentricity in the cam surface. Opening spring release mechanism 135 includes a banana link 137 pivoted at one end on a common axis with the main roller link 133 and at the other end to one end of an open trip latch or "hatchet" 139. The open trip latch 139 is mounted on a fixed pivot pin 141 and has a free curved end 143 forming a latch edge 145. The second, opening spring release mechanism 135 also includes a trip lever 147 fixed to a rotatable trip lever "D" shaft 149. The trip lever 147 rests on the upper end of an opening clapper 151 pivotally supported at 153 by a bracket 155 on which is mounted an opening solenoid 157. A trip latch reset spring 159 connected to this bracket, biases the open trip latch 139 clockwise as shown in FIG. 4a to the latch position as shown in FIGS. 4b and c wherein the latch edge 145 is engaged by the D shaft 149.

Figure 4A:
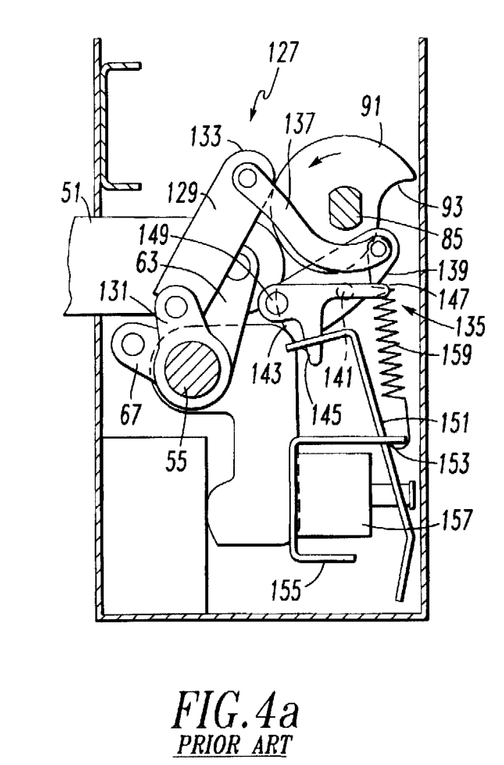
FIG. 4a is a sectional view taken along the line 4—4 in FIG. 2 showing the breaker open and the closing spring discharged.
Figure 4B:
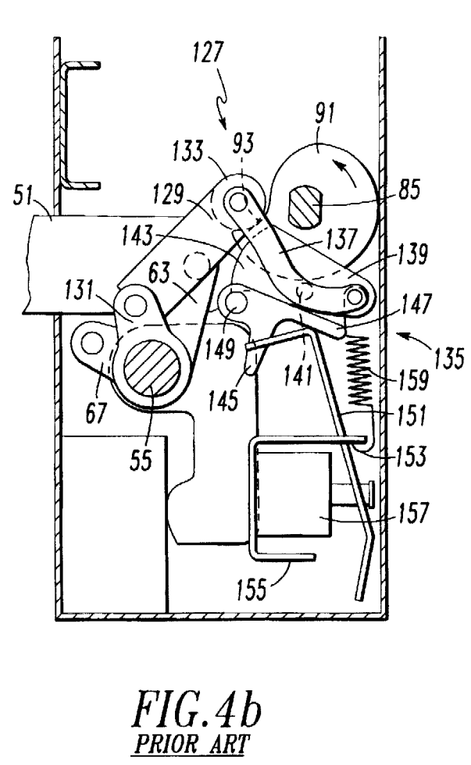
FIG. 4b is similar to the FIG. 4a but showing the breaker in the open position and the closing springs charged.
Figure 4C:
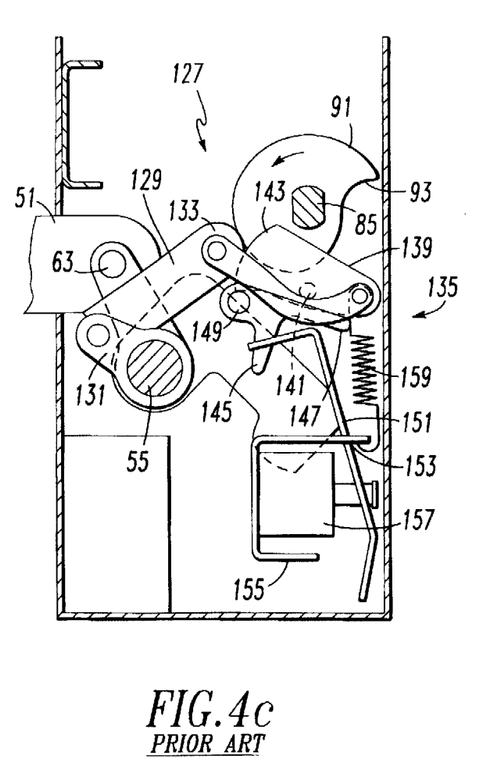
FIG. 4c is similar to FIGS. 4a and b but showing the breaker closed and the closing springs discharged.

FIGS. 4a–c illustrate the coupling of the crank shaft to the pole shaft to close the circuit breaker and tripping of the opening spring release mechanism 135 to open the circuit breaker. FIG. 4a illustrates the position of the parts with the circuit breaker open and the closing springs 69 and 71 discharged. As can be seen, the push rod 51 is retracted so that the separable contacts 40 are open. The sequence is initiated by operation of the charging mechanism 95 to rotate the crank shaft 85 in the counterclockwise direction to charge the closing springs 69, 71 in the manner described above. The trip latch reset spring 159 biases the main link roller 133 against the peripheral caming surface of the closing cam 91 until it falls into the notch 93 with the springs 69, 71 latched in the charged condition. This permits the trip latch reset spring 159 to rotate the open trip latch 139 clockwise to the latched position in which the latch edge 145 is engaged by the D shaft 149 as shown in FIG. 4b. When the closing spring release 99 is actuated, the closing springs 69, 71 rapidly rotate the crank shaft 85 in the manner described above with reference to FIGS. 3a and b. The increasing effective diameter of the closing cam 91 produced by the eccentricity of the cam surface, pushes the main links 129 downward and to the position shown in FIG. 4c. This rotates the pole shaft 55 in the counterclockwise direction to drive the push rod 51 to the left to close the separable contacts 40. As can be seen in FIG. 4c, the open trip latch 139 remains engaged by the D shaft 149.

The circuit breaker is opened manually by pressing on the lower end of the open clapper 151. In addition, it can be opened automatically by actuation of the open solenoid 157 which rotates the open clapper 151 clockwise. The open solenoid 157 is energized by an electronic trip unit in response to current which exceeds predetermined current/time characteristics. Alternatively, the open solenoid 157 can be energized from a remote source to open the circuit breaker. In any case, rotation of the open clapper 151 in the clockwise direction rotates the open trip lever 147 and with it the D shaft 149. The force generated by the charged opening spring 65 through the main links 129 and banana link 37 rotates the open trip latch 139 counterclockwise past the D shaft. This allows the opening spring 65 to rotate the pole shaft 55 to withdraw the push rods 51 and open the separable contacts 40 as the main link roller 133 rolls along the outer surface of the closing cam 91 to the position shown in FIG. 4a.

Figure 5A:
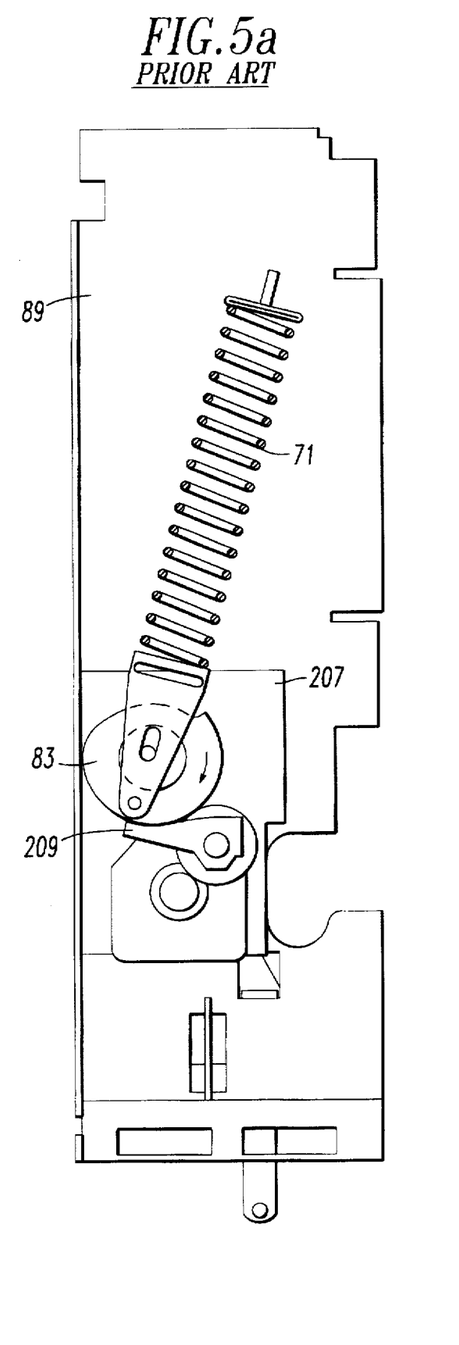
FIG. 5a is a sectional view taken along the line 5—5 in FIG. 2 shown with the closing springs charged.
Figure 5B:
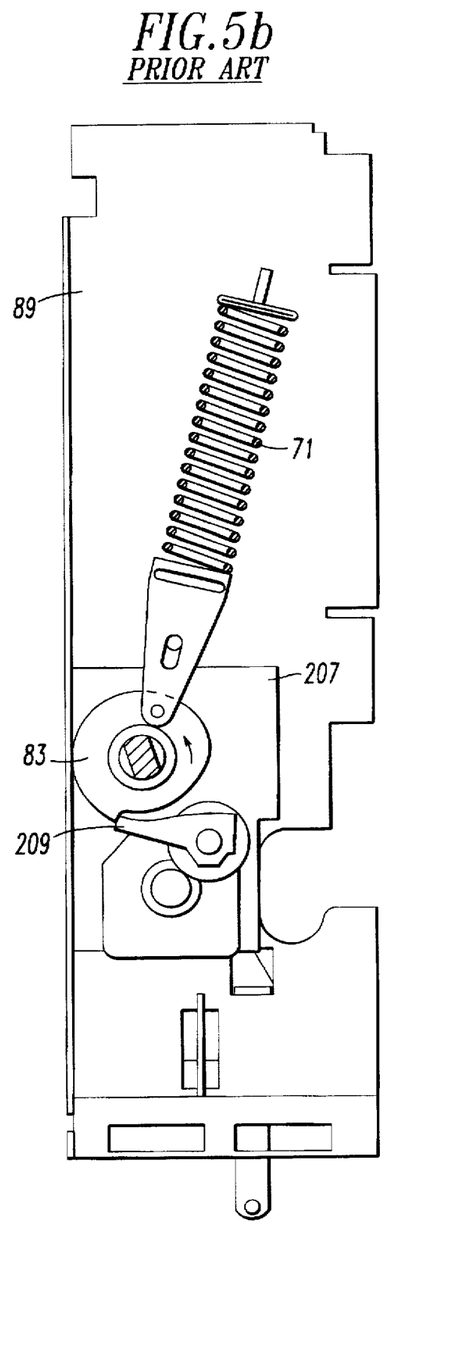
FIG. 5b is a view similar to 5a shown with the closing springs discharged.

Turning to FIGS. 5a and b it can be seen that the spring crank 83 has a peripheral notch 207. When the closing springs 69, 71 are charged, this notch is in the position shown in FIG. 5a. Release of the closing springs by operation of the closing spring release mechanism 99 causes the crank cam 83 to rotate rapidly in the clockwise direction as shown in FIG. 5a. As this occurs, a stop pawl 209 engages the notch 207 to abruptly absorb the rebound energy of the closing springs and hold the closing springs in the fixed discharged position.

Figure 6:
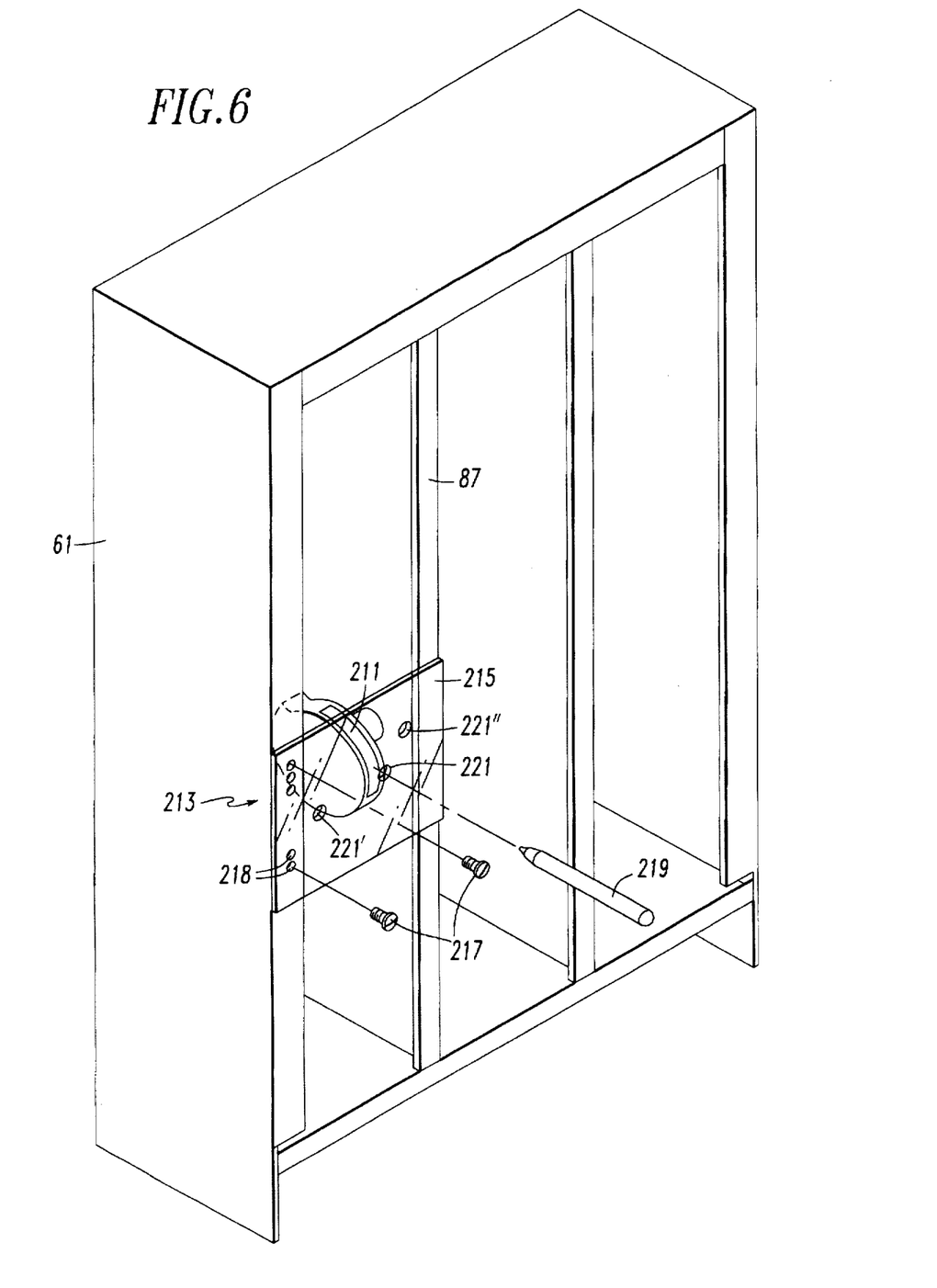
FIG. 6 is an isometric view (with some parts removed for clarity) illustrating operation of the test apparatus in accordance with the invention.
Figure 7:
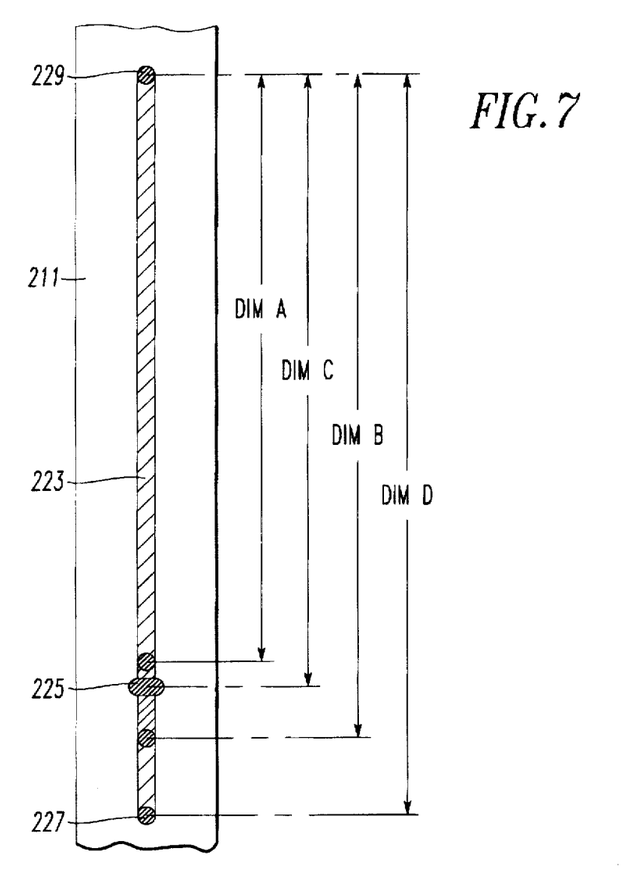
FIG. 7 is a plan view of a test tape generated by the invention.

As discussed, the separable contacts 40 must be rapidly opened and closed. The sizeable spring forces required to do this must be absorbed which results in considerable distortion of the driven parts 54. This combination of factors makes it difficult to observe and evaluate the operation of the circuit breaker. The present invention provides a quantitative evaluation of circuit breaker performance. In accordance with the invention, a recording medium 211 is applied to one of the moving parts of the mechanism 53. As shown in FIG. 6, the driven part selected in the exemplary embodiment of the invention is the spring crank 81. The exemplary recording medium 211 is a piece of adhesive backed tape, such as a piece of masking tape. A length of this tape 211, in the exemplary application of the invention about 7 inches, is wrapped around the peripheral surface of the spring crank 81. This should be done with all the springs discharged to preclude any possibility of injury. A fixture 213, preferably in the form of a template 215, is then secured to the frame 61 adjacent the spring crank 81 carrying the recording medium 211. The template 215 can be secured in place by fasteners 217 which pass through holes 218 and engage threaded apertures (not shown) in the frame 61. The particular template 215 is a piece of plexiglass, although it is not necessary that the template be transparent. This fixture 213 provides support for a writing instrument 219 at a fixed point relative to the frame 61. This fixed point is established by an aperture 221 in the template 15 aligned with the recording medium 211.

After the template 215 is in place, the closing springs are charged in the manner described above. The marking instrument 219 is then inserted through the aperture 221 and into contact with the recording medium 211. The closing spring release mechanism 99 is then actuated to close the circuit breaker. With the marking instrument 219 held at the fixed point by the template 215, a trace 223 is inscribed on the recording medium 211 as the spring crank 81 is rapidly rotated (see FIG. 8). As discussed, the driven parts overshoot, rebound, and then return to a rest position. Thus, the marking instrument 219 will come to rest at an intermediate point 225 spaced from the end most point 227. In order to clearly identify this steady sate, or rest position 225, the marking instrument 219 can be rocked laterally to either side of the trace 223, so that when the marking instrument 219 is removed, the location of the steady sate position 225 is clearly indicated. In the exemplary embodiment of the invention a felt marking pen has been used for the marking instrument 219.

Figure 8:
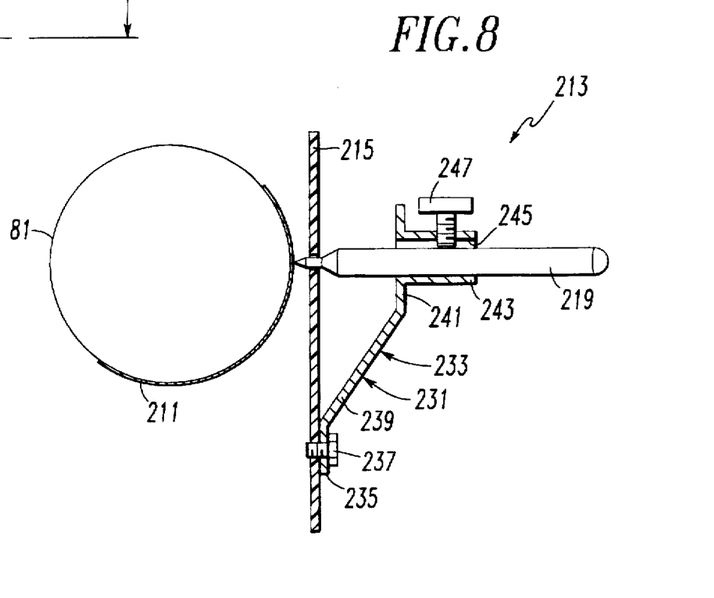
FIG. 8 is a vertical section through another embodiment of test apparatus in accordance with the invention.

The trace 223 provides a quantitative measure of the operation of the circuit breaker. As shown in FIG. 8, the marking instrument 219 leaves a darker deposit above and below the steady state intermediate point 225 which indicate multiple passes of the marking instrument in this area. Measurements are made from the starting point 229: to the closure position indicated by the end of the trace 227 and identified as dimension DIM D, to the rest or steady state position 225 identified as DIM C, and to the extremities of the multiple passes identified as DIM A and DIM B. In all cases the measurements are made to the centers of the marks.

One dimension of importance is the closure distance which is the distance between the end point 227 and the intermediate point 225 and is calculated as DIM D-DIM C. In the case of the exemplary circuit breaker, this closure distance for a new circuit breaker should be at least 0.62 inches. For a breaker which has been in use, this distant in the example should be between 0.50 inches and 2.00 inches. If the closure distance is less than 0.5 inches, this is an indication of several problems including: (1) the closing springs have lost their pre-load or are not within standards of the drawings; (2) the breaker has excessive friction in the mechanism due to dirt or dust; (3) the breaker has excessive binding or interference in the mechanism; (4) disalignment or lack of proper adjustment of mechanism parts; or (5) need for lubing or greasing interfacing mechanism parts, and (6) the circuit breaker should be serviced. A closure distance of greater than 2.00 inches is an indication that the circuit breaker is operating in a "trip-free" mode. This means that the close springs are discharging but the contacts are not moving. The two most common failures which produce this result are excessive wear or misalignment of the D shaft 149 or the opening trip latch or "hatchet" 139.

Upon completion of the test, the marking instrument 219 and template 215 are removed so that the tape 221 can be laid out on a flat surface for measurement. An advantage of this test is that it can be performed by unskilled persons who can then report the measurements to factory engineers or send the tape to the factory for analysis. If retained at the site, the tape can be reapplied to the side of the circuit breaker as a record of past performance. In addition, a trained technician can alter, adjust, or lube the breaker and get results in a short period of time. As an example, if the breaker is lubed, it may then exceed the recommended closure distance, and not need further servicing.

Preferably, the template 215 has additional apertures such as 221' and 221" positioned for alignment with the selected driven part such as the spring crank 81 in circuit breakers of various sizes so that one test kit can be used with a range of sizes of circuit breakers. Additional mounting holes 218 also provide flexibility for using the template 215 with different size circuit breakers.

As an additional aspect of the invention, the fixture 213 may include a support 231 for holding the marking instrument 219 in place in the aperture 221 in the template 215 as shown in FIG. 8. This support 231 is preferably a cantilevered strip of spring steel 233 having a base 235 secured to the template 215 by a fastener 237, an offset intermediate section 239 and a terminal section 241 at a free end having a boss 243 affixed thereto. The boss 243 has a through bore 245 sized to receive the marking instrument 219 which is secured in the boss by a thumb screw 247. The marking instrument 219 is secured in the bore 245 with the boss pulled outwardly slightly from the template 215, so that when the support is released, the marking instrument is spring biased against the recording medium 211. This spring loading permits the marking instrument 219 to remain in contact with the recording medium through operation of the test. This spring loaded support 231 permits the test to be made with power on. Because of the voltages involved, the marking instrument 219 can not be hand held for power on testing.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A method of testing a spring powered switch having a support frame and operated by an operating mechanism having driven parts actuated by release of a charged spring, said method comprising the steps of:

applying a recording medium to a selected one of said driven parts;

mounting a fixture to said support frame adjacent said selected one of said driven parts;

using said fixture to support a marking instrument in contact with said recording medium at a fixed point relative to said frame;

releasing said charged spring to actuate said driven parts while maintaining said marking instrument in contact with said recording medium which moves with said selected one of said driven parts relative to said marking instrument, thereby producing a trace on said recording medium of said movement of said selected one of said driven parts relative to said fixed point; and using said trace to determine operation of said operating mechanism.

2. The method of claim 1 wherein said driven parts overtravel when actuated by release of said charged spring and then return to a rest position, so that said marking instrument contacts said recording medium at an intermediate point on said trace when said driven parts come to said rest position, and wherein said step of using includes measuring said overtravel as a distance between said intermediate point and an end of said trace beyond said intermediate point.

3. The method of claim 2 including manipulating said marking instrument at said rest position to identify said intermediate point on said trace and removing said marking instrument.

4. The method of claim 3 wherein said recording medium is releasably applied to said selected one of said driven parts and including removing said recording medium from said selected one of said driven parts after said trace is recorded on said recording medium.

5. The method of claim 4 including affixing said recording medium to said frame as a record of said test after it has been removed from said selected one of said driven parts.

6. Apparatus for generating a record of a test of a spring powered switch having a support frame and operated by an operating mechanism having driven parts actuated by release of a charged spring, said apparatus comprising;

a recording medium applied to a selected one of said driven parts;

a fixture secured to said frame adjacent said selected one of said driven parts; and a marking instrument supported by said fixture in contact with said recording medium at a fixed point relative to said frame, for generating a trace on said recording medium of movement of said selected one of said driven parts relative to said fixed point when actuated by said release of said charged spring.

7. The apparatus of claim 6 wherein said fixture comprises a template having an aperture therein at said fixed point in which said marking instrument is supported.

8. The apparatus of claim 7 adapted for use with a plurality of switches having said selected one of said driven parts at different fixed points relative to said frame, and wherein said template has apertures for each of said different fixed points.

9. The apparatus of claim 6 wherein said fixture comprises a support biasing said marking instrument into contact with said recording mechanism.

10. The apparatus of claim 9 wherein said support comprises a cantilevered spring steel strip and means securing said marking instrument to a free end of said cantilevered spring steel strip.

* * * * *

UNITED STATES PATENT AND TRADEMARK OFFICE
CERTIFICATE OF CORRECTION

PATENT NO : 5,726,367

DATED : March 10, 1998

INVENTOR(S): Nagar J. Patel et al

It is certified that error appears in the above-identified patent and that said Letters Patent is hereby corrected as shown below:

On the title page, item [75] add,
Ronald W. Crookston, Trafford

Signed and Sealed this

Sixteenth Day of June, 1998

Attest:

BRUCE LEHMAN

Attesting Officer

Commissioner of Patents and Trademarks